Aug. 26, 1941.
W. H. C. NESS ET AL
2,253,802
INSECTICIDE DISPENSER
Filed Aug. 3, 1940
3 Sheets-Sheet 1
Fig. 1.
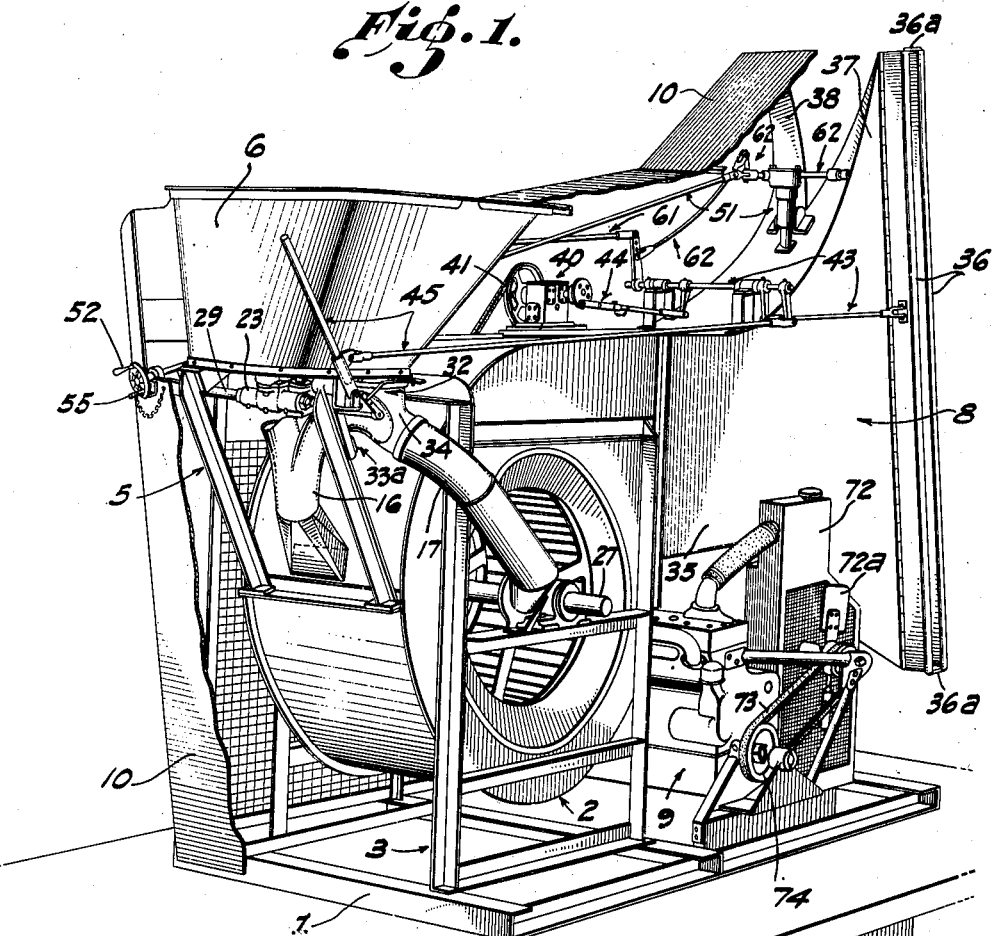
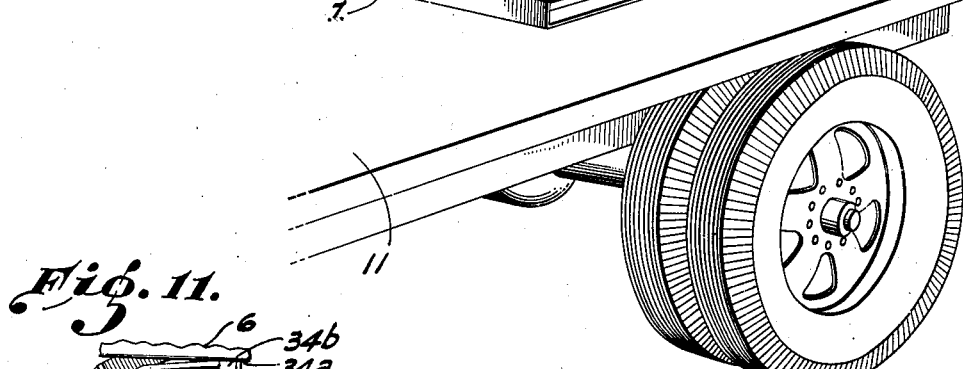
Fig. 11.
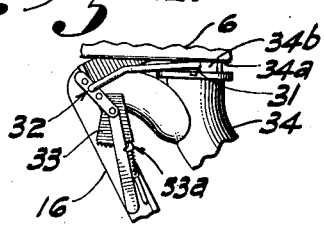
WILLIAM H. C. NESS & JAMES F. HOLMES,
INVENTORS.
BY 
ATTORNEY.

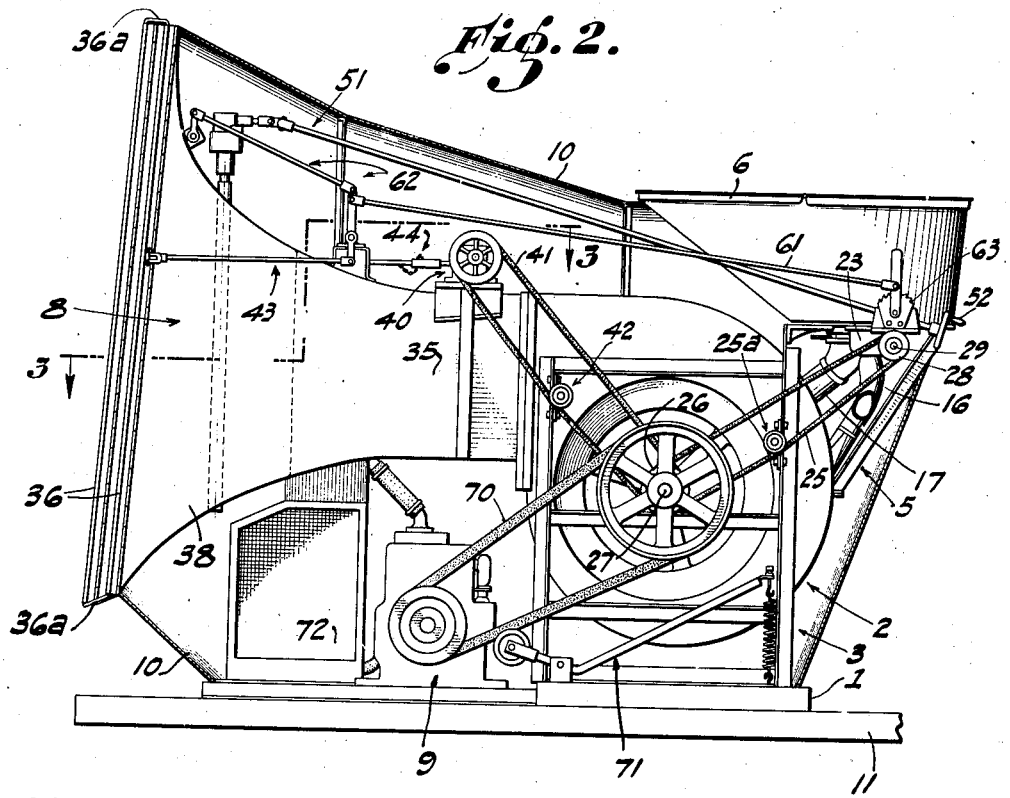
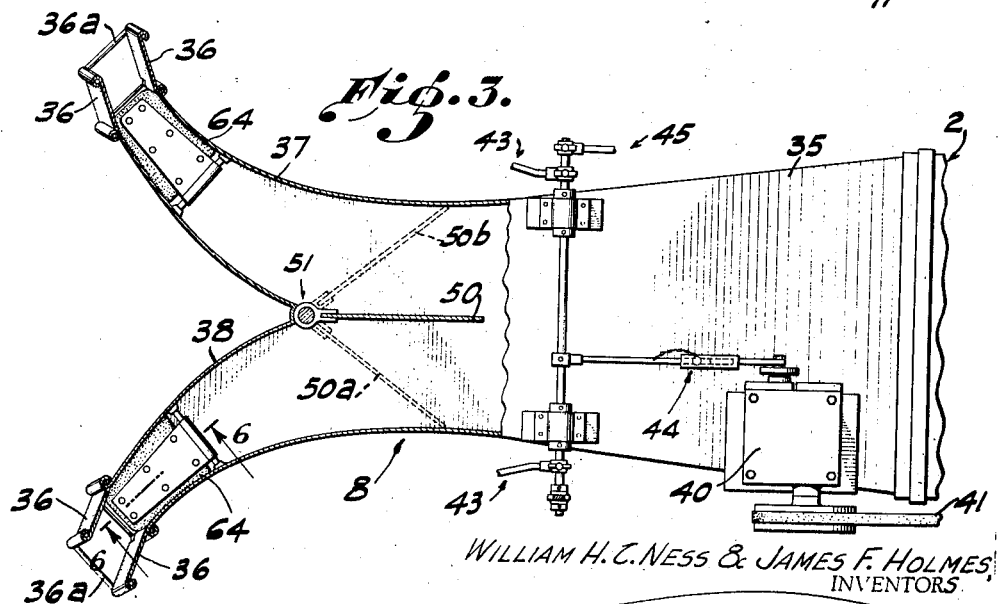

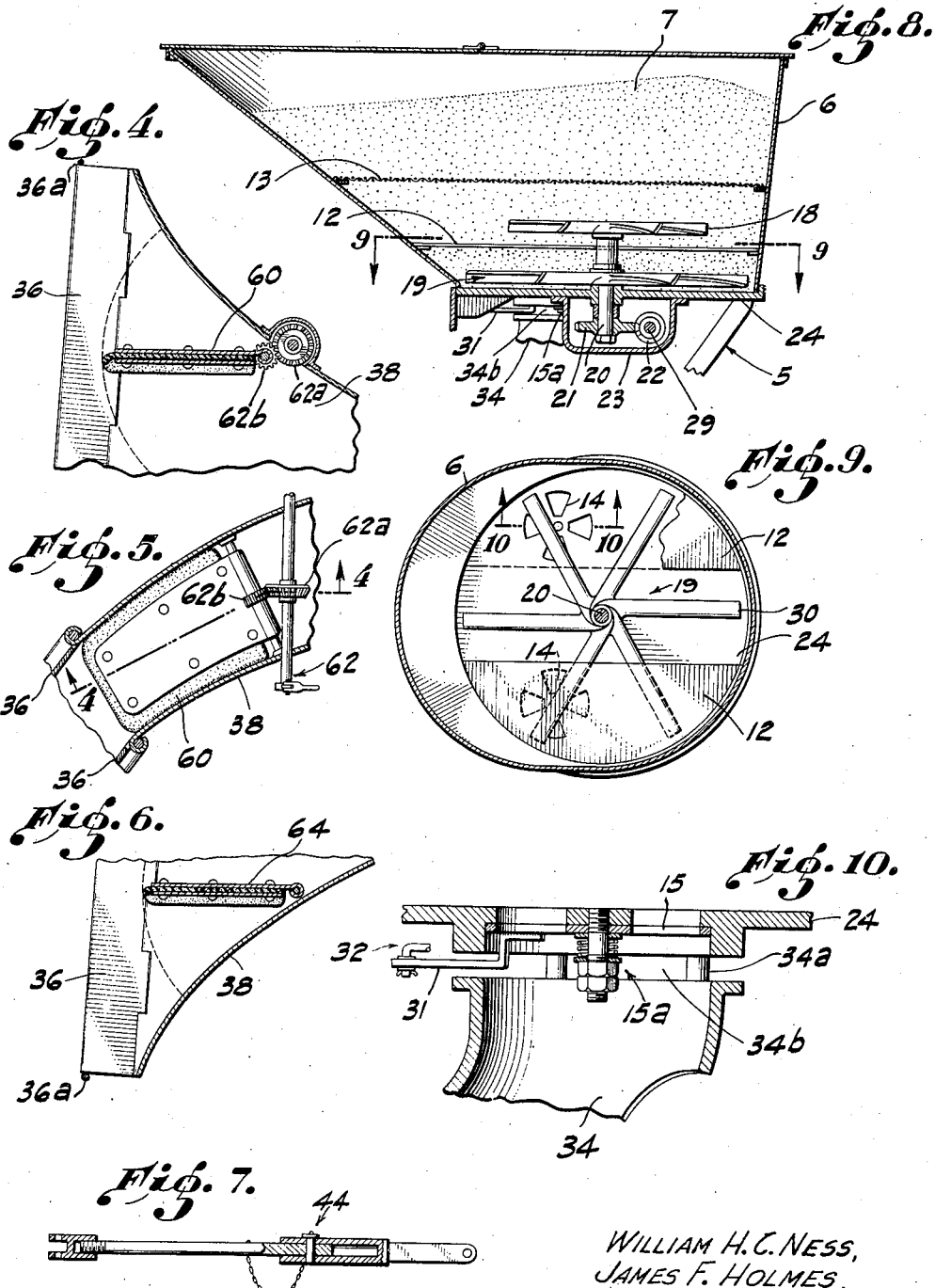

Patented Aug. 26, 1941

2,253,802

UNITED STATES PATENT OFFICE 2,253,802

INSECTICIDE DISPENSER

William H. C. Ness and James F. Holmes, Los Angeles, Calif., assignors to National Cornice Works, Los Angeles, Calif.

Application August 3, 1940, Serial No. 350,905

17 Claims. (Cl. 43—148)

The present invention relates to insecticide dispensers, our principal object being to produce a dispenser which will give fast, thorough, uniform, accurately controlled distribution of insecticides for the control of thrips, aphis, scale, spider and numerous other pests that infest the various types of orchards and crops. The accurately controlled distribution of the feeding material permits the operator to apply the correct dosage as specified by the entomologists.

It is also a main object of the invention to provide an insecticide dispenser wherein all the controls for distributing insecticides from either or both sides; increasing or decreasing the velocity of air output; instantly setting the material feed control for equal and proper chemical dosage; automatically or hand operating the fishtail flippers; raising or lowering the deflectors for uniform dosage and penetration amongst the foliage for either tall or short trees; are made immediately available to the operator at the rear of the unit.

It is a further object of the invention to provide a dispensing unit which is completely enclosed and streamlined to prevent injury to the trees.

It is a still further object of the invention to provide a dispensing unit with automatically operated fishtail flipper fitting which is interchangeable with a special tube fitting for use in directing the stream of insecticide in the desired direction in treating ornamental and tall trees, so arranged that the operators may dust from either or both sides of the device.

With the foregoing and other objects in view, the invention resides in the novel arrangement and combination of parts and in the details of construction hereinafter described and claimed, it being understood that changes in the precise embodiment of the invention herein disclosed may be made within the scope of the invention which is claimed without departing from the spirit thereof.

In the accompanying sheets of drawings, wherein we show a preferred embodiment of our invention which has been reduced to practice and sanctioned by the trade—

Fig. 1 is a perspective view of the apparatus wherein our invention is embodied, some duplicative structure and a part of the metal shrouding being broken away in order the better to disclose underlying structure. In said view is partly shown a truck on which the device is conveyed.

Fig. 2 is a side elevation with the shroud housing and some duplicative structure broken away.

Fig. 3 is an enlarged section taken on line 3—3 of Fig. 2.

Fig. 4 is a section taken on line 4—4 of Fig. 5.

Fig. 5 is a transverse section taken through the flippers illustrating the means whereby the deflector shown in Fig. 4 is operated.

Fig. 6 is a section taken on line 6—6 of Fig. 3.

Fig. 7 is an enlarged detail partly in side elevation and partly in section, showing how the automatic action of the flippers may be changed to manual control.

Fig. 8 is a longitudinally extending vertical mid-section taken through the dosage hopper and parts immediately thereunder.

Fig. 9 is a section taken on line 9—9 of Fig. 8.

Fig. 10 is a fragmentary section taken on line 10—10 of Fig. 9.

Fig. 11 is a fragmentary view of the dosage control lever.

Referring in detail to the drawings, and speaking first of generalities, it will be seen we provide a steel base 1 supporting a specially constructed double inlet single width centrifugal blower 2 by means of a suitably constructed framework 3. To the blower is attached suitable framing materials or shapes constituting a framework 5 whereon is supported the hopper 6 for containing the insecticide material 7.

In referring to the front and rear of the device, the rear will be designated as the side which is nearest the observer when viewing the apparatus perspectively shown in Fig. 1, hence the hopper 6 may be said to be situated rearwardly and well toward the top of the device.

To the discharge end of the blower is detachably fastened the intake end of the tunnel portion of a specially designed and constructed fishtail shaped fitting 8 directly beneath which tunnel portion, on the base 1, is mounted the power unit 9. The entire assembly is enclosed in a streamlined metal shrouding 10 and is easily loaded upon the bed of a motor truck 11 by which means the device is transported through the orchards.

Hopper 6 is designed for a capacity ranging from 150 to 200 pounds depending upon the material being handled. Said hopper is shown divided into vertically spaced compartments by means of the longitudinally extending horizontally spaced apart metal shelves 12 and metal screen guard 13. In the bottom of the hopper subjacent the shelves 12 are shown two identical openings 14, each of which is controlled by a valve 15 through which the material is metered, it being forced by air pressure from the tube 16 that leads from the scroll of the blower into conduit 17 which discharges into the intake of said blower.

The slow motion means whereby the material 7 in the hopper is agitated and fed therefrom into the tube 17 comprises an upper agitator 18, a lower agitator 19, a vertical shaft 20 journalled in the floor 24 of the hopper to which each said agitator is mounted, and a reducer comprising a gear 21 keyed to the shaft 20 and a worm 22 in mesh with said gear, said reducer being mounted in a suitable housing 23 fastened to the underside of the hopper floor 24.

The feeding device is driven through the worm gear reducer 22, 21, by means of V-belt 25 from sheave 26 located on blower shaft 27 through the medium of sheave 28 fastened to shaft 29, adjustable ball bearing idler 25a being provided as a take up for said belt.

Agitator 18 is situated so that its blades operate in the space between the plane of shelves 12 and screen 13 and prevents bridging of material over the space between the shelves, so that a uniform feeding to the lower agitator 19 may be assured. Metal screen 13 being situated immediately above the agitator 18 also prevents injury to operator or the entrance of leaves and other foreign substances.

Agitator 19 is situated so that its blades operate in the space between the plane of shelves 12 and the bottom 24 of the hopper. The blades 30 of this agitator are constructed long enough and sufficiently close to the bottom 24 so that, by reason of their sweep across the openings 14, the material will be fed from the central portion of the hopper to the control valve 15 through which it is metered to the blower by gravity, blower suction and by high pressure air as a result of the by-pass pipe 16. Valves 15 are yieldingly held in registry with openings 14 by means of the bolt and spring construction 15a.

The metering valves 15 are controlled by a lever 31 through a system of linkage 32 connected to quadrant 33 which is provided with an adjustable stop 33a whereby the opening of the metering valves may be set to any predetermined registry with their affiliated openings 14 in order that the feed may be shut off at the end of each row, and immediately brought back to proper setting for trees being treated when the truck 11 has been turned around and is entering the next row to be treated. The metal shelves 12 above the lower agitator blades assure uniform feeding of material regardless of the amount in the hopper.

By referring to Fig. 10 it will be noted the fitting 34, to which the conduit tube 17 is fastened and in which one leg of the bifurcated casting 16 is directed to, by high velocity air, augment the gravity flow of the material into the blower, the pressure thus supplied being in addition to the suction produced by the blower at the mouth of the tube 17; is spaced away from the underside of the hopper by means of spacers 34a in order to provide an intake 34b for the entrainment of air at that point. The strong suction produced by the blower at its intake point coupled with the high velocity air pressure through fitting 34 into tube 17 produces a syphoning effect of air through said intake passage 34b into said fitting 34.

As the material is fed into the intake of blower through tube 17 it is immediately picked up and thoroughly diffused with air and discharged through the fishtail shaped tunnel fitting 8. The tunnel portion 35 of the fishtail shaped fitting is bolted to the discharge end of the blower. The fitting 8 is so designed that the velocity of air is continuously increased from the time it leaves the blower until it is finally discharged between the automatically controlled flippers 36, 36 pivotally fastened on the discharge ends of the fishtail wings 37 and 38 to operate in unison by means of the U-clips 36a.

The flippers 36, 36 being hinged to permit free oscillation, are operated by a gear reducer 40 driven by V-belt 41, provided with a ball bearing idler belt take up 42. Said belt is driven by a sheave on main fan shaft 27 alongside sheave 26 and through the medium of said reducer 40 operates the system of linkage and rocker shaft assembly 43 which in turn operates said flippers. The rapid oscillation of the flippers (approximately forty times a minute) agitates the foliage so that the material is uniformly discharged on the entire surface of the leaves. If automatic action of the flippers is not desired, pin 44, the detail of which is shown on an increased scale in Fig. 7, may be detached and the mechanism hand actuated by the handle and rod construction 45.

The control of the fishtail fitting for one or two row dusting is accomplished by a damper 50, said damper being actuated through control linkage 51 by operating hand wheel 52. By turning the hand wheel in a clockwise direction the left wing 38 of the fishtail is closed by dotted damper 59a for one row dusting on the left side; and by turning the hand wheel in a counterclockwise direction the right wing 37 is closed by dotted damper 59b, for one row dusting on the left hand side. A locking pin 55 is provided as shown in Fig. 1, so that, by turning the hand wheel to intermediate position, said pin may be inserted locking damper 50 in center full line neutral position whereby both wings 37 and 38 of the fishtail are open for two row dusting.

The height at which the material is discharged from each wing of the fishtail is controlled by adjustable deflectors 60 located in the top of each fishtail, the operative sweep vertically of said deflectors being dottedly indicated in Fig. 4. Said deflectors are operated by means of a lever 61 through the medium of linkage 62 and meshing gears 62a and 62b shown connected therewith. The lever 61 is operatively related to a notched quadrant 63 in order that it may be held in various adjusted positions. Similar hinged deflectors 64 (Fig. 6) are provided at the bottom of each fishtail wing and may be operated as above described or moved independently of each other and held in position by friction as shown.

The blower 2 is driven by means of a V-belt 70 by power unit 9, an automatic idler 71 being provided for belt take up. Said power unit 9 is cooled by a specially constructed radiator 72 which, in turn, is cooled by a cooling fan 72a driven by V-belt 73 from a sheave 74 on said power plant.

The power unit is provided with a concealed fuel pump so that fuel may be drawn from the gasoline tank on the motor truck 11 for the operation of the device. All controls, including the throttle and ignition switch for the power plant, are brought to the rear of the device so they are readily available to the operator. A tachometer is also provided, in order that the operator will know at all times the speed at which the blower is operating. The latter items, being considered miscellaneous conventional equipment, have been omitted from the drawings In the operation; considering a sulphur insecticide is being used for tree dusting, the material is fed from hopper 6 (Fig. 8) by lower agitator blades 30 (Fig. 9) carrying material under metal shelves 12 (Fig. 8), over metering valves 15 (Fig. 10), into tube 17 (Fig. 1); whence it is forced by air pressure from tube 16 (Fig. 1), taken off the scroll of the blower and forced through tube 17 to the intake of the blower 2, as shown. Simultaneously air is being entrained into the tube 17 through the annular opening 34b between the spacers 34a at the juncture of the mouth of fitting 34 with the underside of the hopper.

It will be noted only one tube 17 is shown, but provision is made for the use of two as indicated by the broken away duplicative structure whenever deemed necessary, in which case two streams of the insecticide will enter the blower.

In order that the correct amount of insecticide as prescribed by entomologists may be accurately dispensed, mechanism 32, 33, and 33a as described is provided for regulating the valves 15.

As the material is fed into the intake of the blower, as described, it is immediately picked up and thoroughly diffused with the air and discharged into the fishtail shaped tunnel fitting 8 bolted to the discharge end of the blower.

As stated, due to the peculiar design of this fitting, the velocity of air is continually increased from the time of leaving the blower discharge till finally discharged through the automatically controlled flippers 36.

The rapid oscillation of these flippers, which are hinged to permit free oscillation, causes the current of air delivered to agitate the foliage to such an extent that the insecticide dust is dusted uniformly on the entire surface of the leaves.

The peculiar contour of the outwardly directed wings of the fishtail fitting permits of double row dusting, by removing pin 55 and operating the damper 50 (Fig. 3) manually, to position 50a or 50b as described, a single row of trees to the right or left may be treated.

Since the trees of various orchards vary in height, the lateral expulsion of the insecticide should be regulated vertically by means of the deflectors 60 and 64 shown in Figs. 4, 5, and 6.

The entire unit is shrouded with a streamlined sheet metal covering 10 to prevent injury to fruit or trees as it is transported on the truck 11 through the orchards, access panels being provided to permit servicing of all parts of the unit.

All controls of the unit are brought to the operator's station at the rear. From this position he can control deflectors 60, 64 for height adjustment; adjust damper 50 for one or two row dusting; adjust feed valve mechanism 32, 33a for proper dosage; adjust speed of blower; disengage power plant from blower and, when occasion demands, manually operate the flippers 36, 36 by hand mechanism 45.

Owing to the unit, together with its power plant 9, being completely arranged on the sturdy base 1, it is an easy matter to load it onto or remove it from the truck 11.

What is claimed is:

1. A dispenser for treating rows of trees by expelling a powdered insecticide under a forced draft, consisting of a dispensing unit, a power unit for operating said dispensing unit, a common base whereon said units are mounted, said dispensing unit comprising a centrifugal blower provided with a housing having an intake and discharge opening, framework attached to said base for supporting said blower, a fishtail shaped tunnel fitting having the tunnel portion thereof detachably fastened to the discharge side of said blower, a hopper for containing a powdered insecticide, framework for supporting said hopper in a rearwardly elevated relation to said housing, a conduit having an intake and a discharge for conducting said insecticide from said hopper into said blower, said conduit having its discharge end opening into the intake of said blower and its intake end mounted in spaced relation to an opening in the floor of said hopper, means for graduating the flow of insecticide from said hopper to said conduit, means for by-passing a portion of the draft created by said blower from said housing into said conduit at a point subjacent the opening in the floor of said hopper whereby to augment the force of gravity and suction produced at the discharge end of said conduit by said blower in conducting said insecticide through said conduit into said blower, said fishtail shaped fitting comprising vertically extending fishtail shaped wings provided with a vertically extending discharge slot running from top to bottom of each wing, said wings extending rightwardly and leftwardly from the tunnel portion of said fitting, flippers pivotally mounted upon said wings at their extremities adjacent the discharge slot thereof, and means to operate said flippers.

2. The subject matter of claim 1 and, vertically adjustable deflectors mounted in said wings adjacent said discharge slot.

3. A dispenser for treating rows of trees by expelling a powdered insecticide under a forced draft, consisting of a dispensing unit, a power unit for operating said dispensing unit, a common base to which said units are fastened, a truck whereon said base together with its said units is mounted and from which said power unit and in turn said dispensing unit are operated, said dispensing unit comprising a centrifugal blower provided with a housing having an intake and a discharge opening, framework attached to said base for supporting said blower, a fishtail shaped tunnel fitting having the tunnel portion thereof detachably fastened to the discharge side of said blower, a hopper for containing a powdered insecticide, framework for supporting said hopper in a rearwardly elevated relation to said housing, a conduit having an intake and a discharge end for conducting said insecticide from said hopper into said blower, said conduit having its discharge end opening into said intake of said blower and its intake end mounted in spaced relation to an opening in the floor of said hopper, means for graduating the flow of insecticide from said hopper to said conduit, means for by-passing a portion of the draft created by said blower from said housing into said conduit at a point subjacent to the opening in the floor of said hopper whereby to augment the force of gravity in conducting said insecticide through said conduit into said blower, said fishtail fitting comprising vertically extending fishtail shaped wings provided with a vertically extending discharge slot running from top to bottom of each wing, said wings extending rightwardly and leftwardly from the tunnel portion of said fitting, flippers pivotally mounted upon said wings at their extremities adjacent each said slot thereof, vertically adjustable deflectors mounted in said wings, and means operatively related to said power unit to operate automatically said flippers to agitate the foliage of the trees being treated.

4. In a device of the kind described, a blower having a housing provided with an intake and a discharge, a hopper supported by said blower in an elevated relation to said intake, conduit means for conducting material from said hopper into the intake of said blower, and a by-pass conduit opening from the housing of said blower into said conduit to by high velocity air augment the gravity feed of said material from said hopper through said conduit means into the intake of said blower.

5. A streamlined sheet metal covered dispenser for treating rows of trees by expelling a powdered insecticide under a forced draft, consisting of a dispensing unit, a power unit for operating said dispensing unit, said dispensing unit comprising a centrifugal blower provided with a housing having an intake and discharge opening, a fishtail shaped tunnel fitting having the tunnel portion thereof connected to the discharge side of said blower, a hopper for containing a powdered insecticide, means for supporting said hopper in a juxtaposed relation to said housing, a conduit having an intake and a discharge end for conducting said insecticide from said hopper into said blower, said conduit having its discharge end opening into the intake of said blower and its intake end mounted in spaced relation to an opening in the floor of said hopper, means for by-passing a portion of the draft created by said blower from said housing into said conduit at a point subjacent to the opening in the floor of said hopper, said fishtail shaped tunnel fitting comprising apertured wings extending rightwardly and leftwardly from the tunnel portion of said fitting, and means adjustable to deliver a draft of air from said blower to said wings.

6. In a device of the kind described, a blower having a housing provided with an intake and a discharge, a hopper containing horizontally spaced apart shelves, said hopper being supported by said blower in an elevated relation to said intake, there being openings in the floor of said hopper subjacent said shelves, conduit means for conducting material from said hopper openings into the intake of said blower, a by-pass conduit opening from the housing of said blower into said conduit to by high velocity air augment the gravity feed of said material from said hopper through said conduit means into the intake of said blower, means to agitate the material in said hopper above said shelves, means to feed the material occupying the hopper between said shelves to said openings, and means for metering the quantity of material fed from said hopper through said openings into said conduit means.

7. In a device of the kind described, a centrifugal blower having a discharge end, a fishtail shaped tunnel fitting detachably fastened to said end, said tunnel having vertically extending fishtail wings, means adjustable to deliver a draft of air from said blower to both or either of said wings, a pair of flippers hinged to the outer edge portion of each said fishtail wings, and vertically adjustable deflectors in said wings adjacent said flippers for controlling a current of air from said blower.

8. In a device of the kind described, a centrifugal blower having an intake and a discharge, a hopper containing spaced apart shelves, means to support said hopper in a juxtaposed relation to the intake end of said blower, there being openings in the floor of said hopper subjacent said shelves, means to feed material in said hopper to said openings, conduit means for conducting material discharged through said openings into the intake of said blower, and means for by-passing a portion of the air created by said blower into said conduit means.

9. A dispenser consisting of a dispensing unit, a power unit for operating said dispensing unit, said dispensing unit comprising a centrifugal blower provided with a housing having an intake and discharge opening, a fishtail shaped tunnel fitting having the tunnel portion thereof connected to the discharge side of said blower, a hopper for containing a powdered insecticide, said hopper containing horizontally spaced apart shelves superjacent the floor of said hopper, there being openings in the floor of said hopper subjacent said shelves, means to agitate the material in said hopper above said shelves, means to feed the material in the hopper passing through the space between said shelves to and through said floor openings lying therebelow, means for supporting said hopper in a juxtaposed relation to said housing, a conduit having an intake and a discharge end for conducting said insecticide from said hopper into said blower, said conduit having its discharge end opening into the intake of said blower and its intake end mounted in spaced relation to the openings in the floor of said hopper, means for by-passing a portion of the draft created by said blower from said housing into said conduit at a point subjacent to the openings in the floor of said hopper, said fishtail shaped tunnel fitting comprising apertured wings extending rightwardly and leftwardly from the tunnel portion of said fitting, and means adjustable to deliver a draft of air from said blower to said wings.

10. A dispenser for treating rows of trees by expelling a powdered insecticide under a forced draft, consisting of a dispensing unit, a power unit for operating said dispensing unit, a common base to which said units are fastened, said dispensing unit comprising a centrifugal blower provided with a housing having an intake and discharge opening, framework attached to said base for supporting said blower, a fishtail shaped tunnel fitting having the tunnel portion thereof detachably fastened to the discharge side of said blower, a hopper for containing a powdered insecticide, framework for supporting said hopper in a rearwardly elevated relation to said housing, a conduit having an intake and a discharge end for conducting said insecticide from said hopper into said blower, said conduit having its discharge end opening into the intake of said blower and its intake end mounted in spaced relation to an opening in the floor of said hopper, means for graduating the flow of insecticide from said hopper to said conduit, means for by-passing a portion of the draft created by said blower from said housing into said conduit at a point subjacent to the opening in the floor of said hopper whereby to augment the force of gravity in conducting said insecticide through said conduit into said blower, said fishtail shaped fitting comprising vertically extending fishtail shaped wings provided with a vertically extending discharge slot running from top to bottom of each wing, said wings extending rightwardly and leftwardly from the tunnel portion of said fitting, flippers pivotally mounted upon said wings at their extremities adjacent said slot, vertically adjustable deflectors mounted in said wings adjacent said discharge slot, means adjustable to deliver a draft of air from said blower to both or either of said wings, and means operatively related to said power unit to operate automatically said flippers to agitate the foliage of the trees being treated.

11. In a device of the kind described, a centrifugal blower having a discharge end, a fishtail shaped tunnel fitting detachably fastened to said end, said tunnel having vertically extending fishtail wings, means adjustable to deliver a draft of air from said blower to both or either of said wings, and a pair of flippers hinged to the outer edge portion of each said fishtail wing.

12. The subject matter of claim 11 and, means to operate said pairs of flippers in parallelism.

13. In a device of the kind described, a centrifugal blower having a discharge end, a fishtail shaped tunnel fitting fastened to said discharge end, said tunnel having vertically extending fishtail shaped wing ducts, a pair of flippers hinged to the outer edge portion of the sides of said wings forming each said duct, and means to operate in unison said flippers across the path of air delivered through said ducts.

14. In a device of the kind described, a blower having a housing provided with an intake and a discharge, a hopper supported by said blower in an elevated relation to said intake, means for conducting material from said hopper into the intake of said blower, and means for by-passing a portion of the air from the blower housing into the first said means to augment the feed of the material being delivered from said hopper into said blower intake.

15. In a device of the kind described, a blower having a housing provided with an intake and a discharge, a hopper containing horizontally spaced apart shelves, said hopper being supported by said blower in an elevated relation to said intake, there being openings in the floor of said hopper subjacent said shelves, conduit means for conducting material from said hopper openings into the intake of said blower, means to agitate the material in said hopper above said shelves, means to feed the material occupying the hopper between said shelves to said openings, and means for metering the quantity of material fed from said hopper through said openings into said conduit means.

16. In a device of the kind described, a centrifugal blower having an intake and a discharge, a hopper containing spaced apart shelves, means to support said hopper in a juxtaposed relation to the intake end of said blower, there being openings in the floor of said hopper subjacent said shelves, means to feed material in said hopper to said openings, and means for conducting material discharged through said openings into the intake of said blower.

17. In a device of the kind described, a centrifugal blower having a discharge end, a fishtail shaped tunnel fitting detachably fastened to said end, said tunnel having vertically extending fishtail wings, and a pair of flippers hinged to the outer edge portion of each said fishtail wing.

WILLIAM H. C. NESS.
JAMES F. HOLMES.